Nov. 16, 1948.　　　　G. A. RIETZ　　　　2,454,091
HEATER FOR LIVESTOCK WATERING TANKS
Filed Nov. 20, 1945

Inventor:
George A. Rietz,
by　　*Claude N. Pitt.*
His Attorney.

Patented Nov. 16, 1948

2,454,091

UNITED STATES PATENT OFFICE 2,454,091

HEATER FOR LIVESTOCK WATERING TANKS

George A. Rietz, Schenectady, N. Y., assignor to General Electric Company, a corporation of New York Application November 20, 1945, Serial No. 629,788

10 Claims. (Cl. 219—38)

My invention relates to heaters for livestock watering tanks and has for its object a simple and inexpensive heater which functions as a deicer to maintain a drinking hole in the ice formed on the surface of the water in the tank during cold weather.

More particularly, the object of my invention is a heater having a small heating capacity as compared with that required to heat the entire body of water in the tank such that it does not heat the entire body of water to any appreciable degree but functions to keep the tank open during cold weather by preventing the formation of ice over a small portion of the surface of the water. Another object is an electric heater having a predetermined fixed heating capacity which can be used universally in watering tanks of all sizes whether heat insulated or not.

In carrying out my invention in one form I provide a buoyant body or float on which I mount in good thermal relation with the water in the tank an electric heater having sufficient heating capacity to heat only the water in proximity to the exterior of the body so as to maintain it free of the surrounding ice. The float is of such size and shape, preferably disk-like, that it can be depressed easily by the stock, as by tilting, to obtain access to the water in the tank. In one form of my invention I mount an electric heater on the outside of the float so that it extends around the periphery of the float in spaced relation therewith and in position to be submerged in the water.

In a modified form of my invention, I surround the float with a vertically extending flange which projects below the bottom of the heater to form an inverted bucket in which a small quantity of water is heated by a heater attached to the bottom of the float. The flange also projects above the heater to form a drinking cup into which water flows through holes in the float when the float is depressed by the stock. Also the flange serves as a guide to keep the float from being pushed under the ice.

Figure 1:
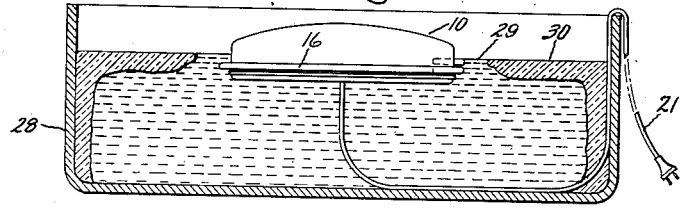
Figure 2:
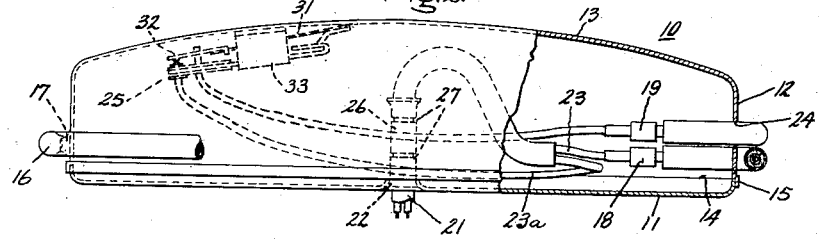
Figure 3:
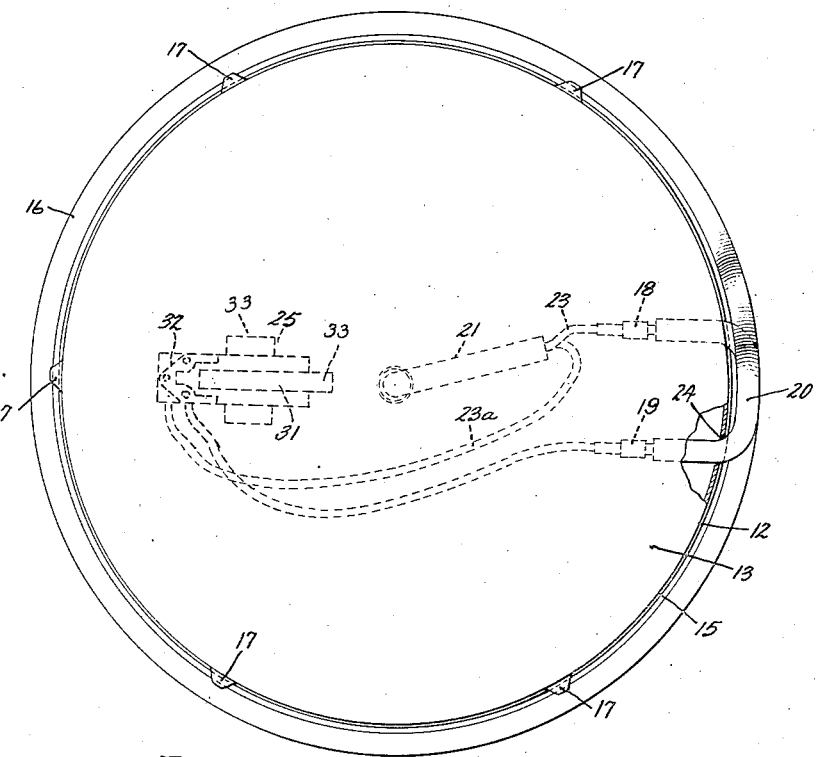
Figure 4:
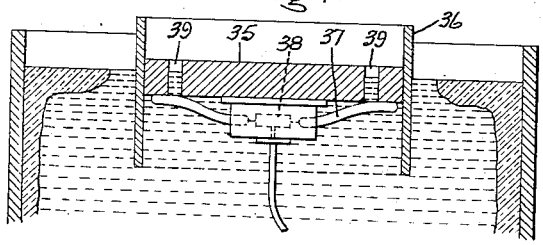

For a more complete understanding of my invention, reference is had to Fig. 1, which is a view mainly in section, of a tank provided with a floating heater embodying my invention; Fig. 2 is a side elevation view, partly in section, of the heater; Fig. 3 is a plan view of the float heater shown in Fig. 2, while Fig. 4 is a view in section of a tank provided with a floating heater constructed in accordance with a modified form of my invention.

Referring to the drawing, in carrying out my invention in one form I provide a hollow metallic body 10 constituting a float which, as shown in the drawing, is somewhat disk-like in form, it being provided with a flat bottom wall 11, a cylindrical peripheral or side wall 12, and a slightly convex top wall 13. The small size of this float, about ten inches in diameter, and its disklike shape adapt it to be depressed by the livestock. The walls are made of suitable thin sheet material, such as copper, steel or a molded plastic material. Preferably, as shown, the float is stamped or otherwise formed in two copper parts having a junction line 14, these parts comprising a bottom part, which consists of the bottom wall 11 with a flange around its periphery, and an upper part consisting of the top wall 13 with a flange around its periphery constituting the side wall 12. The two parts are suitably secured, as by brazing or soldering, to each other and to an overlapping strip 15 at the joint.

The float 10 is provided with electric heating means around its periphery for maintaining the float free of ice formed on the water during cold weather so that it can be readily depressed by the livestock. This heating means as shown consists of metal sheathed electric resistance heater 16 which is bent into an annular or hoop-like form and extending completely around the outside of the float in about ⅛" spaced relation with the side wall 12. The heater 16 is secured to the side wall 12 of the float by means of a plurality of projections 17 in equal spaced relation around the side wall to which projections the outer metal sheath of the heater is suitably brazed or soldered. Preferably, the heater 16 is of the type described and claimed in Patent No. 2,112,729 issued on March 29, 1938, to Charles C. Abbott.

For the electrical connection of the ends 18 and 19 of the heater to electric supply conductors, the end portions of the heater are bent at substantially right angles and are inserted through openings 24 in the peripheral wall of the float as shown in the drawing. Also, the end portions of the heater on the exterior of the float overlap a short distance, as indicated by the reference numeral 20, one end being offset to provide for this overlap relation.

For the connection of the electric heater to a suitable electric source of supply, such as a conventional lighting circuit, a rubber covered twin conductor electric supply lead or cord 21 is brought in to the interior of the float through a central opening 22 in the bottom wall of the float. One of the supply conductors 23 is connected directly to the heater terminal 18, while the other supply conductor 23a is connected through a thermostatically operated switch 25 to the other terminal 19 of the heater. Suitable soldered or brazed joints sealing the float are provided between the ends of the heater and the side walls of the holes through which the ends extend. A suitable water-tight anchoring connection is provided between the cord 21 and the bottom wall 11 by means of a metallic tube 26, preferably made of copper, surrounding the cord and having its lower end soldered or brazed to the side walls of the opening 22. A watertight, mechanically strong connection is made between the tube 26 and the supply conductor 21 by spinning two grooves in the tube, indicated by the reference numeral 27, whereby the walls of the grooves are compressed tightly on the cord. As a further precaution against leakage, the tube 26 extends upward inside the float to a point somewhat above the water level on the outside of the float. Therefore, in the event of leakage around the cord, the water cannot rise to the upper end of the tube.

As shown in Fig. 1, the float is anchored by the supply cord 21 in place in the tank 28 in position to be reached conveniently by the cattle, horses, sheep, hogs, etc., and tipped and pushed down to give access to the water. As indicated in Fig. 1, the supply cord is preferably draped or hung over the edge of the tank and extends downward to the bottom and thence along the bottom of the tank to a point below the float. It will be understood that the length of the cord resting on the bottom of the tank depends upon the length of the cord that is provided in the tank, since the float when installed with the water free of ice seeks a position with the cord extending substantially vertically downward to the bottom of the tank, as shown in the drawing.

An important advantage of my invention is that a heater of standard wattage capacity is adapted for use in tanks of all sizes and constructions. As shown in Fig. 1, the tank is disproportionately small as compared with the size of the float, which preferably has a typically overall diameter outside of the heating unit 16 of 10½ inches.

The heater 16 does not supply enough heat when energized to heat appreciably the total volume of water in the tank. In a typical device this heater has a capacity of about 300 watts, which is small as compared with the capacity required to heat the entire body of water sufficiently to prevent freezing. It does, however, supply enough heat to prevent freezing of the water in a narrow zone completely surrounding the float so that the float is always free of ice, even in the coldest winter weather, such as 30° F. below zero or more. The zone of water 29 immediately surrounding the float may, for example, be approximately two inches wide when the remainder of the surface of the water is covered with a relatively thick layer of ice 30. The slightly convex upper surface of the float minimizes deposits of water, snow or ice on the float and facilitates engagement and depression as by tilting of the float by the cattle, horses, or other animals drinking from the tank. The animals soon learn to tip the float since they readily detect the narrow zone of water around the float. The float is tipped far enough below the surface of the water for convenient drinking of the water by the animal and the float thereafter immediately rises to its former position, although this position may be changed somewhat by changes in the water level in the tank. However, if the float should become submerged completely or appreciably under the surrounding ice, it will melt the ice and assume a free floating position. The top wall 13 is maintained by this heater at a temperature substantially above freezing which provides comfort for the animals in depressing the float with their muzzles. The heater when submerged under ice tends to melt out a disk of ice because the most effective heating is adjacent the heater, which disk it lifts somewhat and gradually melts. Moreover, in the event that the float is frozen solidly in position with the heater deenergized, when the heater is energized the float frees itself from the ice.

An important feature of my invention is the proper positioning of the heater 16 on the float relative to the bottom of the float, i. e., relative to the water level. Preferably, the heater is positioned very near the surface of the water, for example three-eighths inch to one-half inch below the surface. This positioning close to the surface is desirable because of the fact that the heated water in the vicinity of the heater tends to flow downward by convention. This is because of the fact that the density of water is highest over a temperature range of somewhat above freezing to about 39° F. Thus, under these conditions, if the heater were any considerable distance below the surface of the water, the freezing of the water at the surface would not be prevented by the heater.

The switch 25 in the heater circuit is operated by a bimetallic thermostatic bar 31 in response to the ambient air temperature conditions and the radiant heat of the sun, as described and claimed in a copending application S. M. 649,355, filed by R. E. Brodie on February 21, 1946, assigned to the same assignee as this application, now Patent 2,430,272, issued November 4, 1947. Preferably, the bar 31 is connected by a suitable over-center snap spring to a pivoted switch contact 32 cooperating with a stationary contact as described and claimed in U. S. Patent No. 2,079,282, issued on May 4, 1937, to Kenneth W. DuBois.

This thermostatic switch is secured to the top wall 13 by means of a suitable bracket 33. As thus arranged, any change in the outside air temperature or heating of the top wall 13 by the sun is transmitted quickly to the thermostat. This arrangement has the effect of giving the thermostat an anticipatory response to changes in freezing conditions. For example, if the air temperature suddenly drops, the thermostat is cooled and closes the circuit to the heater before the water has time to freeze. Moreover, during the day the radiant heat from the sun may be sufficient to prevent freezing of the water in the tank, even though the air temperature is below freezing. In such case the thermostat is heated by the sun's heat to deenergize the heater.

In Fig. 4 I have shown a modified form of my invention in which a small quantity of water may be heated and made available to the animal when the float is depressed. In this form the float comprises a disk member 35 made of suitable buoyant material, such as wood, and surrounded with a metal band 36 which extends below the member 35 and also extends above it so as to form lower and upper flanges defining an upper drinking cup and a lower inverted water heating cup. An electric heater 37 is secured to the bottom of the member 35, together with a thermostat 38 for controlling the circuit of the heater. The member 35 is furthermore provided with a plurality of holes 39 through which the water flows, when the float is depressed by the stock, into the space provided by the upper flange.

With this modified form of my invention the heater 37 has sufficient heating capacity, substantially greater than required for the form of my invention shown in Figs. 1 to 3, inclusive, to appreciably heat the quantity of water entrapped below the member 35 by the lower flange. Therefore, when the float is depressed this heated water flows out through the holes 39 and is accessible to the animal. With this arrangement also the periphery of the float is heated sufficiently to prevent the ice from forming tightly around the float so that it is maintained free of ice.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. A heater for livestock watering tanks comprising a buoyant body arranged to float on the water in the tank, electric heating means carried by said body in good thermal relation with the water in proximity to the exterior of said body so as to maintain said body free of ice, and electric supply conductor means for said heater secured to said body so as to serve as an anchor for said body.

2. A heater for livestock watering tanks comprising a buoyant body arranged to float on water in the tank, electric heating means carried by said body arranged to heat the water in proximity to said body so as to maintain said body free of ice, and electric supply conductor means for said heater secured to the bottom of said body so as to serve as an anchor for said body.

3. A heater for livestock watering tanks comprising a buoyant body arranged to float on the water in the tank, and electric heating means carried by said body extending substantially completely around the outside of said body and arranged to heat the water in proximity to said body so as to maintain said body free of ice, said body being of such size and shape as to adapt it to be depressed by the livestock to obtain access to the water in the tank, and electric supply conductor means for said heater secured to said body so as to serve as an anchor for said body.

4. A heater for livestock watering tanks comprising a float of such size and shape as to adapt it to be depressed by the livestock, an electric heater extending around the outside of said float, and means securing said heater to said float in spaced relation therewith in position to be immersed when said float is placed in water, said heater having sufficient heating capacity to maintain said float free of ice.

5. A floating heater for livestock watering tanks comprising a float of such size and shape as to adapt it to be depressed by the livestock, a sheathed resistance heater extending substantially completely around said float, and means for securing said heater to said float in position to be immersed when said float is placed in water, said heater having sufficient heating capacity to maintain said float free of ice formed on the surface of the water.

6. A floating heater for livestock watering tanks comprising walls forming a flat cylindrical sealed float of such size and shape as to adapt it to be depressed by the livestock, a sheathed electric resistance heater surrounding the periphery of said float having its ends extending through a side wall of said float into the interior thereof, means securing said heater to the peripheral wall of said float in spaced relation therewith adjacent the bottom of said float in position to be immersed when said float is placed in water, said heater having sufficient heating capacity to maintain said float free of ice formed on the surface of the water, and electric supply conductor means for said heater extending through the bottom wall of said float.

7. A heater for livestock watering tanks comprising a float of such size and shape as to be adapted to be depressed by the livestock, top and bottom walls on said float forming an upper drinking cup and a lower inverted water heating cup, said float being provided with an aperture connecting said cups so that when said float is depressed water entrapped in said lower cup flows through said aperture into said drinking cup, and an electric heater secured to the bottom of said float for heating the water in said lower cup.

8. A heater for livestock watering tanks comprising a float of such size and shape as to be adapted to be depressed by the livestock, a flange member surrounding said float projecting above and below said float so as to form an upper drinking cup and a lower inverted water heating cup, said float being provided with an aperture connecting said cups so that when said float is depressed water entrapped in said lower cup flows through said aperture into said drinking cup, and an electric heater secured to the bottom of said float in said lower cup for heating the water in said lower cup and for maintaining said float free from ice.

9. A floating heater for livestock watering tanks comprising a float, a sheathed resistance heater extending substantially completely around said float, means securing said heater to said float in a predetermined substantially uniform spaced relation therewith and in position on said float to be immersed when the float is placed in water, said heater having sufficient heating capacity to maintain said float free of ice formed on the surface of the water and said float being of such size and shape as to adapt it to be depressed by the livestock to obtain access to the water in the tank.

10. A floating heater for livestock watering tanks comprising walls forming a hollow sealed float, a sheathed resistance heater extending substantially completely around said float having its ends extending through a wall of said float, water-tight joints between the sheath of said heater and said wall, means securing said heater to said float in a predetermined substantially uniform spaced relation therewith and in position on said float to be immersed when the float is placed in water, said heater having sufficient heating capacity to maintain said float free of ice formed on the surface of the water and said float being of such size and shape as to adapt it to be depressed by the livestock to obtain access to the water in the tank, and electric supply conductor means for said heater extending through a wall of said float and connected to said heater.

GEORGE A. RIETZ.

REFERENCES CITED

The following references are of record in the file of this patent:

UNITED STATES PATENTS

| Number | Name | Date |
|---|---|---|
| 1,430,548 | Hogue | Oct. 3, 1922 |
| 1,731,506 | Simzer | Oct. 15, 1929 |
| 1,909,973 | Lewis et al. | May 23, 1933 |
| 2,133,388 | Henderson | Oct. 18, 1938 |
| 2,430,272 | Brodie | Nov. 4, 1947 |